US007613437B2

(12) United States Patent

Sugihara et al.

(10) Patent No.: US 7,613,437 B2

(45) Date of Patent: Nov. 3, 2009

(54) RECEIVER AND BROADCAST RECEIVING METHOD

(75) Inventors: Shogo Sugihara, Neyagawa (JP); Koji Harada, Neyagawa (JP)

(73) Assignee: ONKYO Corporation, Neyagawa (JP)

( * ) Notice: Subject to any disclaimer, the term of this patent is extended or adjusted under 35 U.S.C. 154(b) by 561 days.

(21) Appl. No.: 11/468,806

(22) Filed: Aug. 31, 2006

(65) Prior Publication Data

US 2007/0202822 A1 Aug. 30, 2007

(30) Foreign Application Priority Data

Feb. 28, 2006 (JP) ............................ 2006-054080

(51) Int. Cl.
*H04B 1/18* (2006.01)

(52) U.S. Cl. ............... 455/186.1; 455/154.1; 455/161.1

(58) Field of Classification Search .............. 455/186.1, 455/188.1, 185.1, 418, 68, 140, 150.1, 164.2
See application file for complete search history.

(56) References Cited

U.S. PATENT DOCUMENTS 5,606,726 A * 2/1997 Yoshinobu .................. 725/114
2006/0056437 A1* 3/2006 Fishwick .................... 370/412

FOREIGN PATENT DOCUMENTS

| | | |
|---|---|---|
| JP | 03-167922 | 7/1991 |
| JP | 08-088572 | 4/1996 |
| JP | 2002-368637 | 12/2002 |
| JP | 2003-060600 | 2/2003 |

* cited by examiner

*Primary Examiner*—Thuan T Nguyen
(74) *Attorney, Agent, or Firm*—Renner, Otto, Boiselle & Sklar, LLP

(57) ABSTRACT

If a sub broadcast is unavailable so a reception means receives the main broadcast instead of the sub broadcast, reception of the sub broadcast is booked. When the sub broadcast is booked and the sub broadcast becomes available, the reception means automatically receives the sub broadcast booked instead of the main broadcast. Accordingly, reception of the sub broadcast can start automatically when the sub broadcast starts, without inputting instructions to select the sub broadcast repeatedly, whereby operation performed by a user can be simplified.

8 Claims, 6 Drawing Sheets

RECEIVER AND BROADCAST RECEIVING METHOD

BACKGROUND OF THE INVENTION

1. Field of the Invention

The present invention relates to a receiver for receiving digital broadcast including the main broadcast and one or a plurality of sub broadcasts, and to a broadcast receiving method.

2. Description of the Related Art

Currently, digital radio broadcasting including the main broadcast and one or a plurality of sub broadcasts is proposed. For example, in the Europe, DAB (Digital Audio Broadcasting) is broadcasted as digital radio broadcasting. In digital radio broadcasting, one broadcast is selected from a plurality of broadcasts, and for the selected broadcast, one main broadcast or sub broadcast is selected and received, among the main broadcast and one or a plurality of sub broadcasts. The main broadcast is broadcasted constantly as long as the broadcast station broadcasts, so if the main broadcast is selected by a user, a receiver can receive the main broadcast without fail. On the other hand, sub broadcasts are not broadcasted constantly, so if a sub broadcast is selected by a user when it is not broadcasted, the receiver cannot receive the sub broadcast. In such a case, the receiver is adapted to select and receive the main broadcast corresponding to the sub broadcast automatically Therefore, in order that the receiver receives the sub broadcast when broadcasting of the sub broadcast starts, it is required to reenter an instruction to select the sub broadcast through operation by the user, which is very bothersome. Further, the user may miss the desired broadcast if the user is not aware that broadcasting of the selected sub broadcast has started.

Further, for a standard of digital radio broadcasting in which the main broadcast is not broadcasted constantly, the same problem will occur even to the main broadcast. Namely, if the main broadcast is selected by a user when the main broadcast is not broadcasted, a receiver selects and receives a sub broadcast corresponding to the main broadcast automatically. In order that the receiver receives the main broadcast when broadcasting of the main broadcast starts, it is required to reenter an instruction to select the main broadcast through operation by the user, which is very bothersome.

SUMMARY OF THE INVENTION

An object of the present invention is to provide a receiver capable of receiving a sub broadcast automatically when broadcasting of the sub broadcast starts in the case that the sub broadcast has not been broadcasted and the main broadcast has been received instead, without reentering an instruction to select the sub broadcast.

A receiver according to a preferred embodiment of the present invention comprises: a selection section for selecting one main broadcast or sub broadcast from broadcasts including the main broadcast and one or a plurality of sub broadcasts; a reception section for receiving the main broadcast or a sub broadcast; an availability determination section for determining, when a sub broadcast is selected by the selection section, whether the sub broadcast is available; an instruction section for instructing the reception section to receive the sub broadcast if the sub broadcast is determined as available, and instructing the reception section to receive the main broadcast instead of the sub broadcast if the sub broadcast is determined as unavailable; and a booking section for booking reception of the sub broadcast if the instruction section instructs the reception section to receive the main broadcast instead of the sub broadcast. When reception of the sub broadcast is booked by the booking section, if the sub broadcast is determined as available by the availability determination section, the instruction section instructs the reception section to receive the sub broadcast.

Preferably, when the reception section is receiving a sub broadcast, the availability determination section determines whether the sub broadcast becomes unavailable, and if the sub broadcast is determined to become unavailable, the instruction section instructs the reception section to receive the main broadcast instead of the sub broadcast, and the booking section books reception of the sub broadcast.

Preferably, the booking section includes: a selection storage section for storing the main broadcast or a sub broadcast selected by the selection section; and a reception storage section for storing the main broadcast or a sub broadcast received by the reception section, and when a sub broadcast is stored on the selection storage section and the main broadcast is stored on the reception storage section, the booking section books the sub broadcast stored on the selection storage section.

Preferably, when a sub broadcast is stored on the reception storage section, if the sub broadcast stored on the reception storage section is determined as unavailable by the availability determination section, the instruction section instructs the reception section to receive the main broadcast instead of the sub broadcast, and the booking section books the sub broadcast.

Preferably, the broadcast further includes an availability status indicating whether the main broadcast and one or a plurality of sub broadcasts are available, and the availability determination section determines whether a sub broadcast is available based on the availability status.

Preferably, the booking section further includes: a timer booking selection storage section for storing the start time, the end time and a sub broadcast to be received at the start time; and a timer booking reception storage section for storing the main broadcast or a sub broadcast received based on the stored content of the timer booking selection storage section. At the start time stored on the timer booking selection storage section, the availability determination section determines whether the sub broadcast stored on the timer booking selection storage section is available. If the sub broadcast is determined as available, the instruction section instructs the reception section to receive the sub broadcast, and if the sub broadcast is determined as unavailable, the instruction section instructs the reception section to receive the main broadcast instead of the sub broadcast. If the instruction section instructs the reception section to receive the main broadcast instead of the sub broadcast, the booking section stores the main broadcast on the timer booking reception storage section to thereby book reception of the sub broadcast. When reception of the sub broadcast is booked by the booking section, if the sub broadcast is determined as available by the availability determination section, the instruction section instructs the reception section to receive the sub broadcast, and at the end time stored on the timer booking selection storage section, the instruction section instructs the reception section to receive the main broadcast or a sub broadcast stored on the selection storage section.

When a sub broadcast selected by a user is unavailable and the reception section receives the main broadcast instead of the sub broadcast, reception of the sub broadcast is booked. When the sub broadcast is booked, if the sub broadcast becomes available, the reception section automatically receives the sub broadcast booked instead of the main broadcast. Accordingly, reception of the sub broadcast can start automatically when the sub broadcast starts without reentering an instruction to select the sub broadcast by the user, whereby operation performed by a user can be simplified. Further, it is also possible to solve a problem that the user misses the desired broadcast by not being aware that broadcasting of the sub broadcast has started. Moreover, the same effect may be achieved when booking the main broadcast.

DETAILED DESCRIPTION OF THE PREFERRED EMBODIMENTS

Figure 1:
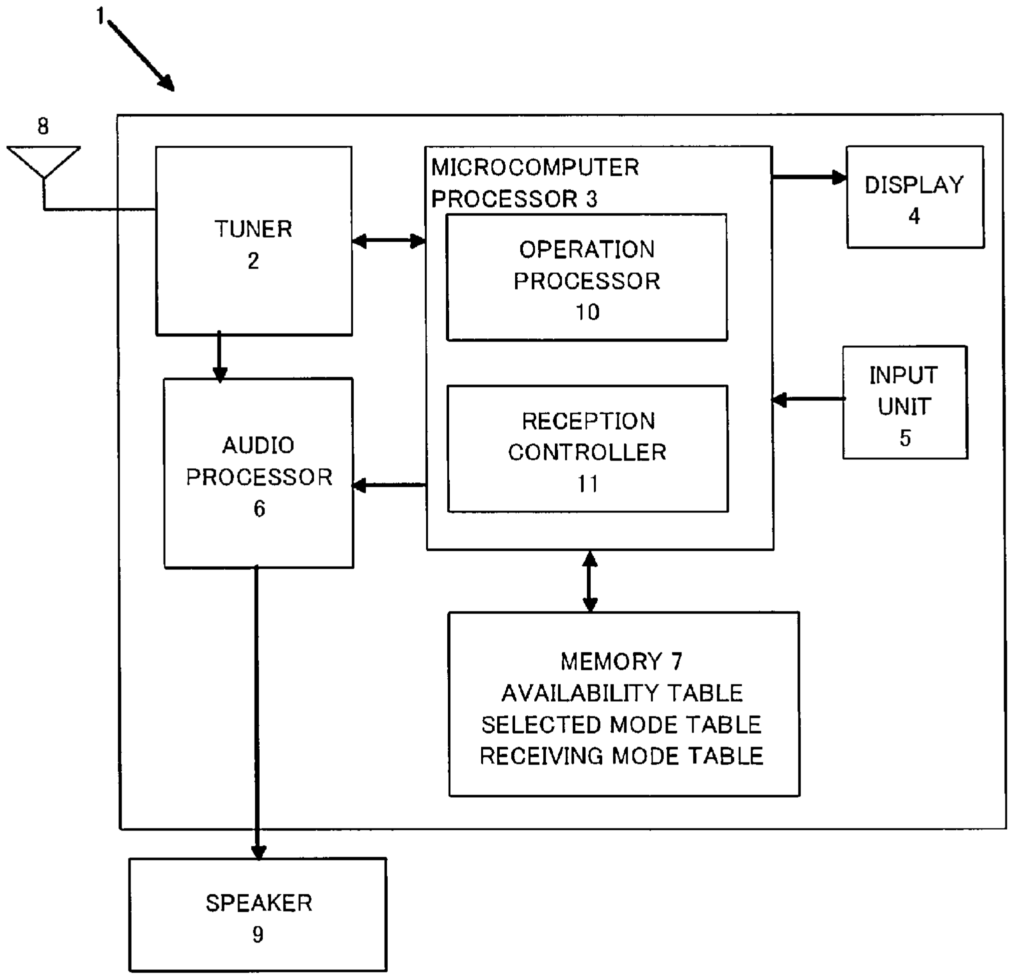
FIG. 1 is a block diagram showing the configuration of a receiver 1 according to a preferred embodiment of the present invention.

Hereinafter, preferred embodiments of the present invention will be described specifically with reference to the drawings, but the present invention is not limited to these embodiments. These embodiments will describe a receiver 1 for digital radio broadcasting, but this also applies to digital television broadcasting. FIG. 1 is a schematic block diagram showing the receiver 1 according to a preferred embodiment of the present invention. The receiver 1 includes a tuner 2, a microcomputer processor 3, a display 4, an input unit 5, an audio processor 6 and a memory 7.

The tuner 2 receives one broadcast selected from a plurality of broadcasts received by an antenna 8, based on an instruction from the microcomputer processor 3. In more detail, since each broadcast includes a plurality of programs (the main broadcast or sub broadcasts, details will be described later), the tuner 2 receives one program selected from the plural programs. The tuner 2 supplies audio stream of the received program to the audio processor 6. The audio processor 6 decodes and digital/analog converts the received audio stream, and supplies it to a speaker 9 connected outside so as to reproduce the audio.

Figure 2:
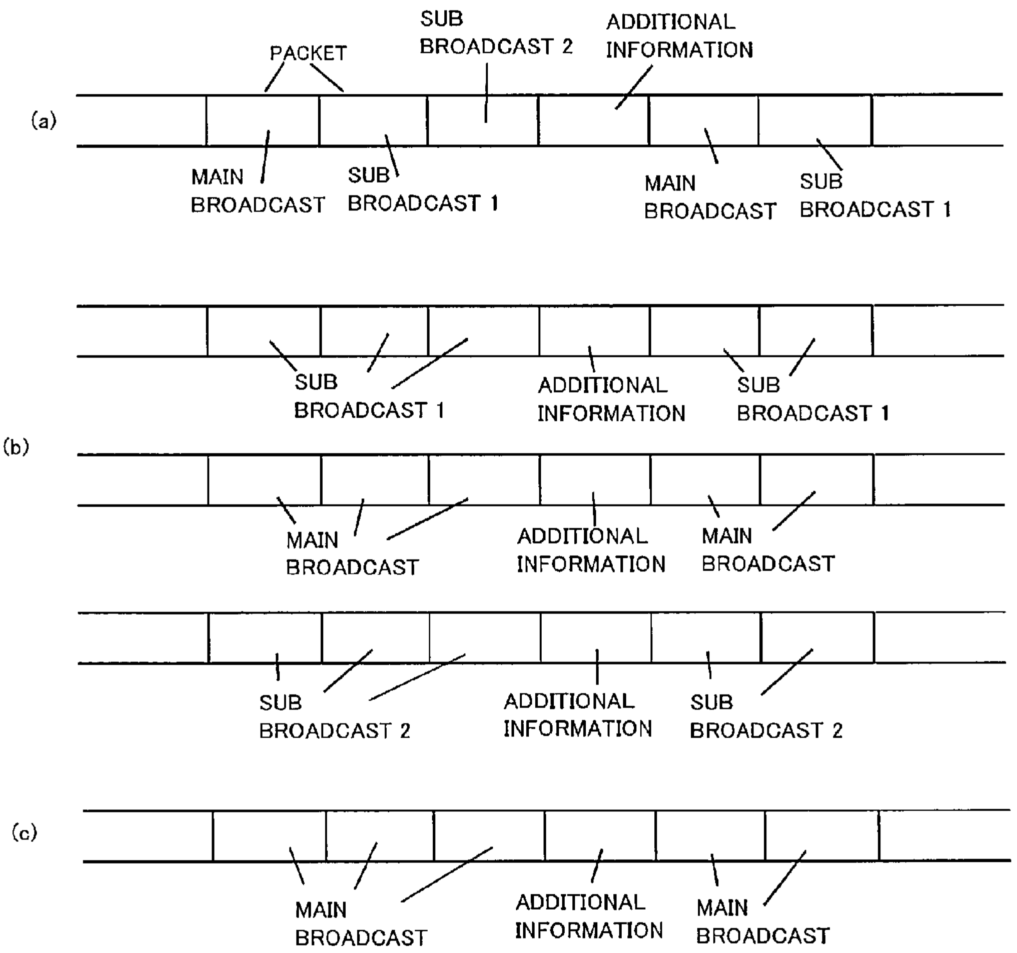
FIG. 2 is a diagram showing data structures of broadcasts including the main broadcast and sub broadcasts.

FIG. 2 is a schematic diagram showing exemplary data structures of broadcasts. The broadcasts include the main broadcast and one or a plurality of sub broadcasts (in the example, two sub broadcasts 1 and 2). In this case, a broadcast by a unit of the main broadcast, the sub broadcast 1 and the sub broadcast 2 is called a program. Sub broadcasts may be broadcasts having contents relating to the main broadcast or broadcasts having contents not relating to the main broadcast. Although not limited specifically, as for the data structures of the main broadcast and the sub broadcasts, the main broadcast and the sub broadcasts may be transmitted sequentially as packets in a frequency band as shown in FIG. 2(*a*), or only the main broadcast may be broadcasted in a frequency band, and the sub broadcast 1 and the sub broadcast 2 may be broadcasted in frequency bands slightly different (e.g. 0.1 MHz) from the frequency of the main broadcast as shown in FIG. 2(*b*), or (a) and (b) may be combined. In the present example, the main broadcast is broadcasted constantly, but the sub broadcasts are broadcasted not constantly (e.g., a case of not broadcasting the sub broadcasts is shown in FIG. 2(*c*)).

The broadcast also includes additional information. The additional information is various kinds of information relating to the broadcast. For example, whether the main broadcast and the sub broadcasts are broadcasted currently, that is, an availability status indicating whether the tuner 2 can receive the main broadcast and the sub broadcasts, is included. An availability status is transmitted regularly for each of the main broadcast and the sub broadcasts (at least at the same time as or immediately before starting (ending) broadcasting of the program). Further, the additional information includes metadata such as broadcast title, broadcast category, broadcast station name, broadcast language, broadcast area, artist name and the like. Since ID is given to each of the main broadcast (sub broadcasts) and the additional information, the tuner 2 can identify and classify whether the received data is the main broadcast (sub broadcast) or the additional information based on the ID.

The microcomputer processor 3, including an operation processor 10 and a reception controller 11, is for controlling the overall operation of the receiver 1. The microcomputer processor 3 executes each processing of the receiver 1 described later based on the operating program of the receiver 1 stored on a ROM, etc., not shown. If a program selected by a user (e.g., sub broadcast 1) is unavailable, the microcomputer processor 3 causes the tuner 2 to receive another program (e.g., main broadcast) instead of the sub broadcast 1, and when the sub broadcast 1 becomes available, causes the tuner 2 to receive the sub broadcast 1 automatically. As described above, processing to let the sub broadcast 1 be received when it becomes available is called booking reception of the sub broadcast 1. The operation processor 10 receives a selection instruction of a broadcast and a program by a user, and stores the selected program on a selected mode table described later. The reception controller 11 instructs the tuner 2 on the broadcast and the program to be received, and stores the program currently received on a receiving mode table described later.

The memory 7 stores an availability table shown in Table 1 below.

TABLE 1

Availability Table

| Main Broadcast Availability Flag | Sub Broadcast 1 Availability Flag | Sub Broadcast 2 Availability Flag |
|---|---|---|
| Set(1) | Clear(0) | Set(1) |

The availability table is a table indicating whether each program of a broadcast selected by the user is currently broadcasted, that is, whether the tuner 2 can receive the each program currently. The availability table includes a main broadcast availability flag, a sub broadcast 1 availability flag, and a sub broadcast 2 availability flag. Each broadcast availability flag is set (1) when each program is broadcasted, and is cleared (0) when it is not broadcasted. Set or clear of each broadcast availability flag is carried out with reference to the availability status included in the additional information received by the tuner 2.

The memory 7 further stores a selected mode table shown in Table 2 below.

TABLE 2

| Selected Mode Table |
| --- |
| Sub Broadcast 1 |

The selected mode table is a table for storing a program selected by an instruction from the user as a selected mode. When the main broadcast is selected by the user, the main broadcast is stored on the selected mode table, and when the sub broadcast 1 is selected, the sub broadcast 1 is stored, and when the sub broadcast 2 is selected, the sub broadcast 2 is stored.

The memory 7 also stores a receiving mode table shown in Table 3 below.

TABLE 3

| Receiving Mode Table |
| --- |
| Main Broadcast |

The receiving mode table is a table for storing a program that the tuner 2 is receiving currently as a receiving mode. When the main broadcast is received, the main broadcast is stored on the receiving mode table, and when the sub broadcast 1 is received, the sub broadcast 1 is stored, and when the sub broadcast 2 is received, the sub broadcast 2 is stored.

If the selected mode stored on the selected mode table is the sub broadcast 1 (or sub broadcast 2) and the receiving mode stored on the receiving mode table is the main broadcast, this is such a case that a user selected the sub broadcast 1 (or sub broadcast 2) but since the sub broadcast 1 (or sub broadcast 2) is not broadcasted, the main broadcast is received instead. This means that reception of the sub broadcast 1 (or sub broadcast 2) stored on the selected mode table is booked. Accordingly, whether booking is made or not can be determined by referring to the two tables, so when broadcasting of the sub broadcast 1 (or sub broadcast 2) starts and a sub broadcast 1 (or sub broadcast 2) availability flag is set, it is possible to cause the tuner 2 to start reception of the sub broadcast 1 (or sub broadcast 2) automatically.

The display 4 displays information about the broadcast and program currently received (e.g., broadcast name and program name) and the like, and is an LCD for example.

The input unit 5 transmits a user instruction to the microcomputer processor 3 upon receipt of the instruction from the user, and consists of manipulation keys, a remote controller or the like. The input unit 5 includes a tuning (up/down) key, a preset registration/delete key preset call keys (e.g., number keys 1 to 10 corresponding to preset numbers).

Figure 3:
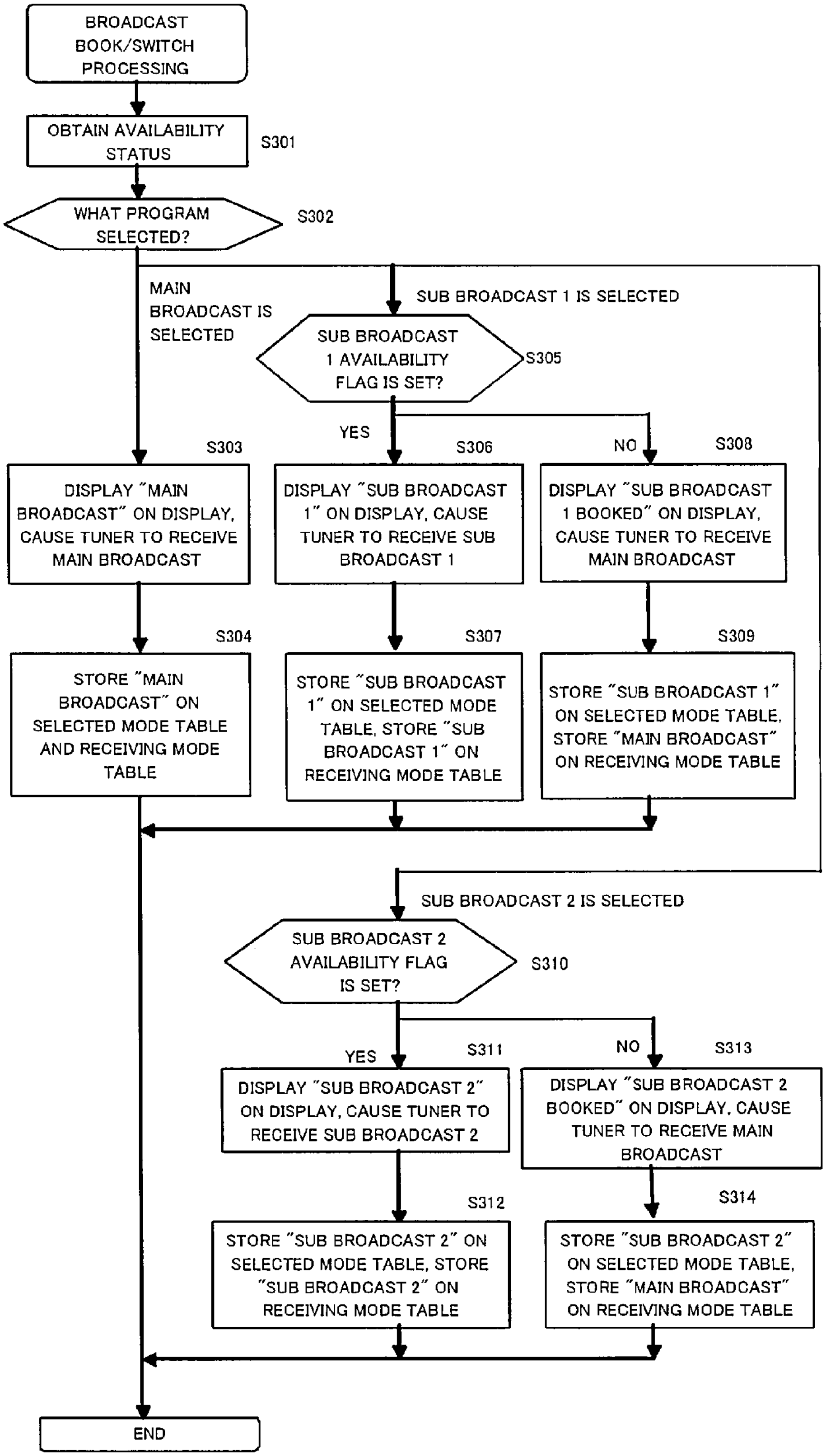
FIG. 3 is a flowchart showing processing to book a sub broadcast.

Next, processing to book a sub broadcast will be described with reference to FIG. 3. First, in order to determine the current availability of each program, the microcomputer processor 3 obtains an availability status via the tuner 2 (S301). Based on the received availability status, the microcomputer processor 3 sets or clears each flag (main broadcast availability flag, sub broadcast 1 availability flag, sub broadcast 2 availability flag) in the availability table of Table 1.

The microcomputer processor 3 determines a program selected by the user (S302). As a method of selecting a program, programs may be switched in the order of the main broadcast, the sub broadcast 1, the sub broadcast 2 and the main broadcast by manipulating the up/down key, or a program which has been preset-registered may be selected by a preset call. If the main broadcast is selected (S302: main broadcast), the microcomputer processor 3 causes the tuner 2 to receive the main broadcast, and displays "main broadcast" on the display 4 (S303). In this example, since the main broadcast is broadcasted constantly, it is not necessary to determine whether the main broadcast is currently broadcasted. Then, the microcomputer processor 3 stores the "main broadcast" on the selected mode table as a selected mode, and stores the "main broadcast" on the receiving mode table as a receiving mode (S304). In this case, since the stored content of the selected mode table and the stored content of the receiving mode table are the same (both are main broadcast), booking of a sub broadcast will not be made.

Next, if the sub broadcast 1 is selected (S302: sub broadcast 1), the microcomputer processor 3 determines whether the sub broadcast 1 is currently broadcasted, that is, whether the sub broadcast 1 is available (S305). More specifically, the microcomputer processor 3 determines whether the sub broadcast 1 availability flag is set in the availability table. If the sub broadcast 1 availability flag is set (S305: YES), the sub broadcast 1 is currently available, so the microcomputer processor 3 causes the tuner 2 to receive the sub broadcast 1, and displays "sub broadcast 1" on the display 4 (S306). The microcomputer processor 3 stores the "sub broadcast 1" on the selected mode table as a selected mode, and stores the "sub broadcast 1" on the receiving mode table as a receiving mode (S307). In this case, since the stored content of the selected mode table and the stored content of the receiving mode table are the same (both are sub broadcast 1), booking of a sub broadcast will not be made.

On the other hand, if the sub broadcast 1 availability flag 1 is cleared (S305: NO), the sub broadcast 1 is not broadcasted currently so it is unavailable. Therefore, the microcomputer processor 3 causes the tuner 2 to receive the main broadcast instead of the sub broadcast 1, and displays "sub broadcast 1 booked" on the display 4 (S308). The microcomputer processor 3 stores the "sub broadcast 1" on the selected mode table as a selected mode, and stores the "main broadcast" on the receiving mode table as a receiving mode (S309). In this case, since the stored content of the selected mode table and the stored content of the receiving mode table are different, the sub broadcast 1 stored on the selected mode table is booked.

Note that processing in the case of selecting the sub broadcast 2 (S302: sub broadcast 2) is the same as that in the case of selecting the sub broadcast 1, so explanation is omitted. Namely, each processing of S310 to S314 corresponds to each processing of S305 to S309.

Through the processing described above, when a sub broadcast selected by the user is currently unavailable, the tuner 2 receives the main broadcast instead of the sub broadcast, and the sub broadcast is stored on the selected mode table and the main broadcast is stored on the receiving mode table, whereby reception of the sub broadcast can be booked such that the tuner 2 will start receiving the sub broadcast automatically when the sub broadcast currently unavailable becomes available.

Next, processing to start receiving the booked sub broadcast by the tuner 2 instead of the main broadcast, when the booked sub broadcast becomes available, will be described. First, in order to determine whether each program is currently available, the microcomputer processor 3 obtains an availability status via the tuner 2 (S401). Based on the availability status obtained, the microcomputer processor 3 sets or clears each flag (main broadcast availability flag, sub broadcast 1 availability flag, sub broadcast 2 availability flag) in the availability table.

The microcomputer processor 3 determines the current selected mode (main broadcast, sub broadcast 1 or sub broadcast 2), that is, a program selected by the user, with reference to the stored content of the selected mode table (S402). If the current selected mode is the main broadcast (S402: main broadcast), reception of the sub broadcast is not booked, so the processing ends.

If the current selected mode is the sub broadcast 1 (S402: sub broadcast 1), the microcomputer processor 3 determines whether the current receiving mode (program currently received) is the main broadcast or the sub broadcast 1 with reference to the stored content of the receiving mode table (S403). That is, the microcomputer processor 3 determines whether the tuner 2 receives the main broadcast in the state that the sub broadcast 1 is booked, or the tuner 2 receives the sub broadcast 1 without any booking.

If the current receiving mode is the main broadcast (S403: main broadcast), the microcomputer processor 3 determines whether the sub broadcast I is currently available (S404). More specifically, the microcomputer processor 3 determines whether a sub broadcast 1 availability flag is set in the availability table. If the sub broadcast 1 availability flag is cleared (S404: NO), the sub broadcast 1 has not been broadcasted yet and it is unavailable, so the processing ends. On the other hand, if the sub broadcast 1 availability flag is set (S404: YES), broadcasting of the booked sub broadcast I starts, so the microcomputer processor 3 causes the tuner 2 to receive the sub broadcast 1, and displays "sub broadcast 1 start" on the display 4 (S405). Thereby, when broadcasting of the booked sub broadcast 1 starts, the tuner 2 can start receiving the sub broadcast 1 automatically. Then, the microcomputer processor 3 stores the sub broadcast 1 on the receiving mode table as a receiving mode (S406). As a result, the stored content of the selected mode table and the stored content of the receiving mode table are the same (both are sub broadcast 1), so the booking of the sub broadcast 1 is released.

On the other hand, if the current receiving mode is the sub broadcast 1 (S403: sub broadcast 1), the microcomputer processor 3 determines whether the sub broadcast 1 is currently unavailable (S407). That is, the microcomputer processor 3 determines whether the sub broadcast 1 received becomes unavailable. More specifically, the microcomputer processor 3 determines whether the sub broadcast 1 availability flag in the availability table is cleared. The availability status indicating unavailability is transmitted at the same time as or immediately before the broadcast of the sub broadcast 1 ends, so it is possible to determine or predict the sub broadcast 1 currently received becomes unavailable. If the sub broadcast 1 availability flag is set (S407: NO), the sub broadcast 1 is still broadcasted and available, so the processing ends. On the other hand, if the sub broadcast 1 availability flag 1 is cleared (S407: YES), broadcasting of the sub broadcast 1 ends so the sub broadcast 1 becomes unavailable, so the microcomputer processor 3 causes the tuner 2 to receive the main broadcast instead of the sub broadcast 1, and displays "sub broadcast 1 end" on the display 4 (S408). Thereby, when the broadcast of the sub broadcast 1 ends, the tuner 2 can start receiving the main broadcast automatically. Then, the microcomputer processor 3 stores the main broadcast on the receiving mode table as a receiving mode (S409). As a result, the stored content of the selected mode table and the stored content of the receiving mode table become different, so the sub broadcast 1 stored on the selected mode table is booked. Accordingly, when broadcasting of the sub broadcast 1 starts again (S404: YES), the tuner 2 can receive the booked sub broadcast 1 automatically (S405).

Note that each processing in the case of the current selected mode being the sub broadcast 2 (S402: sub broadcast 2) is the same as each processing in the case of the current selected mode being the sub broadcast 1, so explanation is omitted. Namely, each processing of S410 to S416 corresponds to each processing of S403 to S409.

Through the processing described above, if the sub broadcast 1 is stored on the selected mode table and the main broadcast is stored on the receiving mode table whereby the sub broadcast 1 is booked, when broadcasting of the sub broadcast 1 starts, the tuner 2 can switch the broadcast to be received from the main broadcast to the sub broadcast automatically. Further, when broadcasting of the sub broadcast 1 ends, the tuner 2 switches the broadcast to be received from the sub broadcast 1 to the main broadcast automatically, and the sub broadcast 1 is stored on the selected mode table and the main broadcast is stored on the receiving mode table, whereby the sub broadcast 1 is booked. Accordingly, when broadcasting of the sub broadcast 1 starts again, the tuner 2 can switch the broadcast to be received from the main broadcast to the sub broadcast 1 automatically Accordingly, if the sub broadcast 1 is selected by the user, it is possible to receive the sub broadcast 1 while the sub broadcast 1 is broadcasted and to receive the main broadcast instead of the sub broadcast 1 while the sub broadcast 1 is not broadcasted. Therefore, a user does not need to select a program corresponding to the start and end of broadcasting of the sub broadcast 1.

Figure 5:
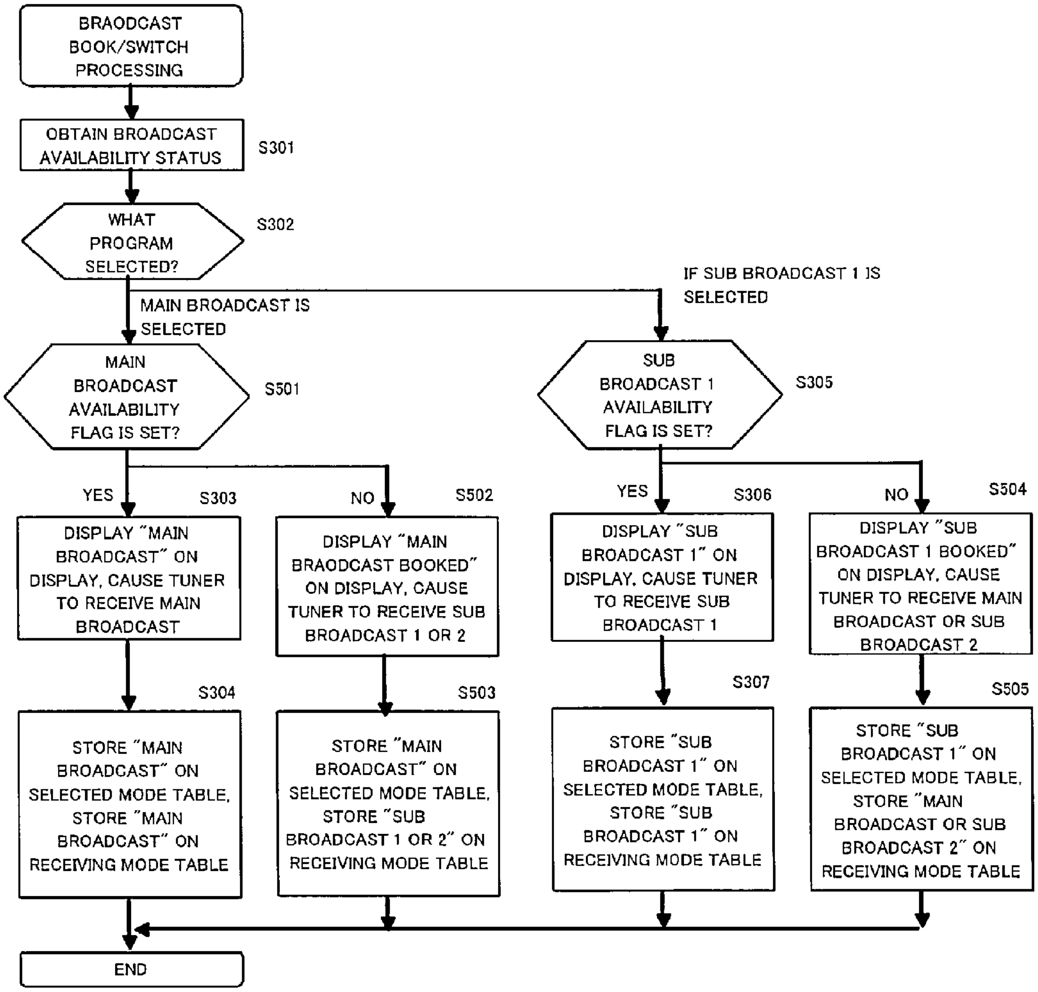
FIG. 5 is a flowchart showing processing to book a selected program.

Next, another preferred embodiment of the present invention will be described. In this example, the main broadcast and the sub broadcasts are not always broadcasted, and the main broadcast can be booked as well. Booking processing of the main broadcast will be described with reference to FIG. 5. The same processing as that of FIG. 3 is denoted by the same reference numeral and explanation is omitted. If the main broadcast is selected by the user (S302: main broadcast) but the main broadcast is not broadcasted (S501: NO), the microcomputer processor 3 selects a program which is broadcasted from the sub broadcast 1 and the sub broadcast 2 with reference to the availability table, and causes the tuner 2 to receive it (S502). Then, the microcomputer processor 3 stores the main broadcast on the selected mode table as a selected mode, and stores the sub broadcast 1 or the sub broadcast 2, which is received by the tuner 2, on the receiving mode table. Thereby, the stored content of the selected mode table and the stored content of the receiving mode table are different, so the main broadcast stored on the selected mode table is booked.

Figure 4:
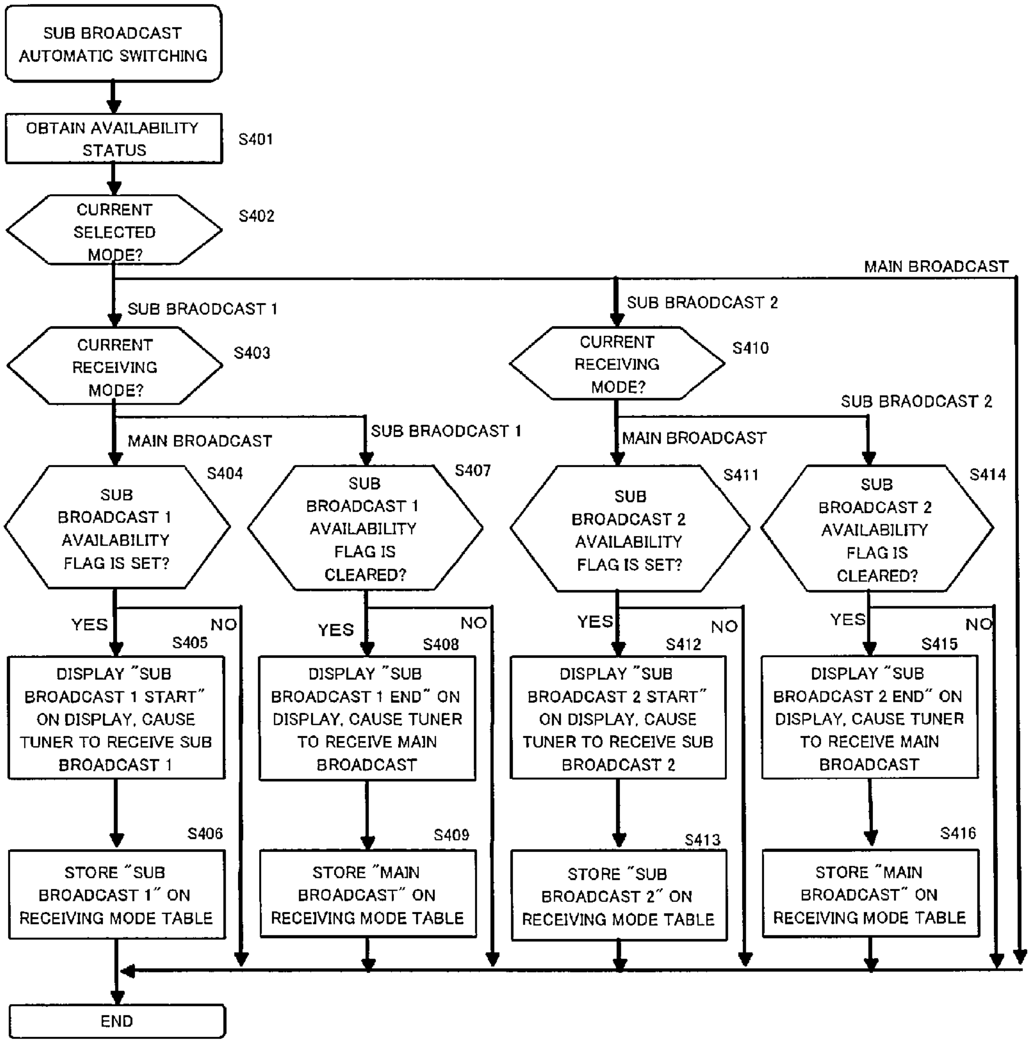
FIG. 4 is a flowchart showing processing to start reception of a booked sub broadcast.
Figure 6:
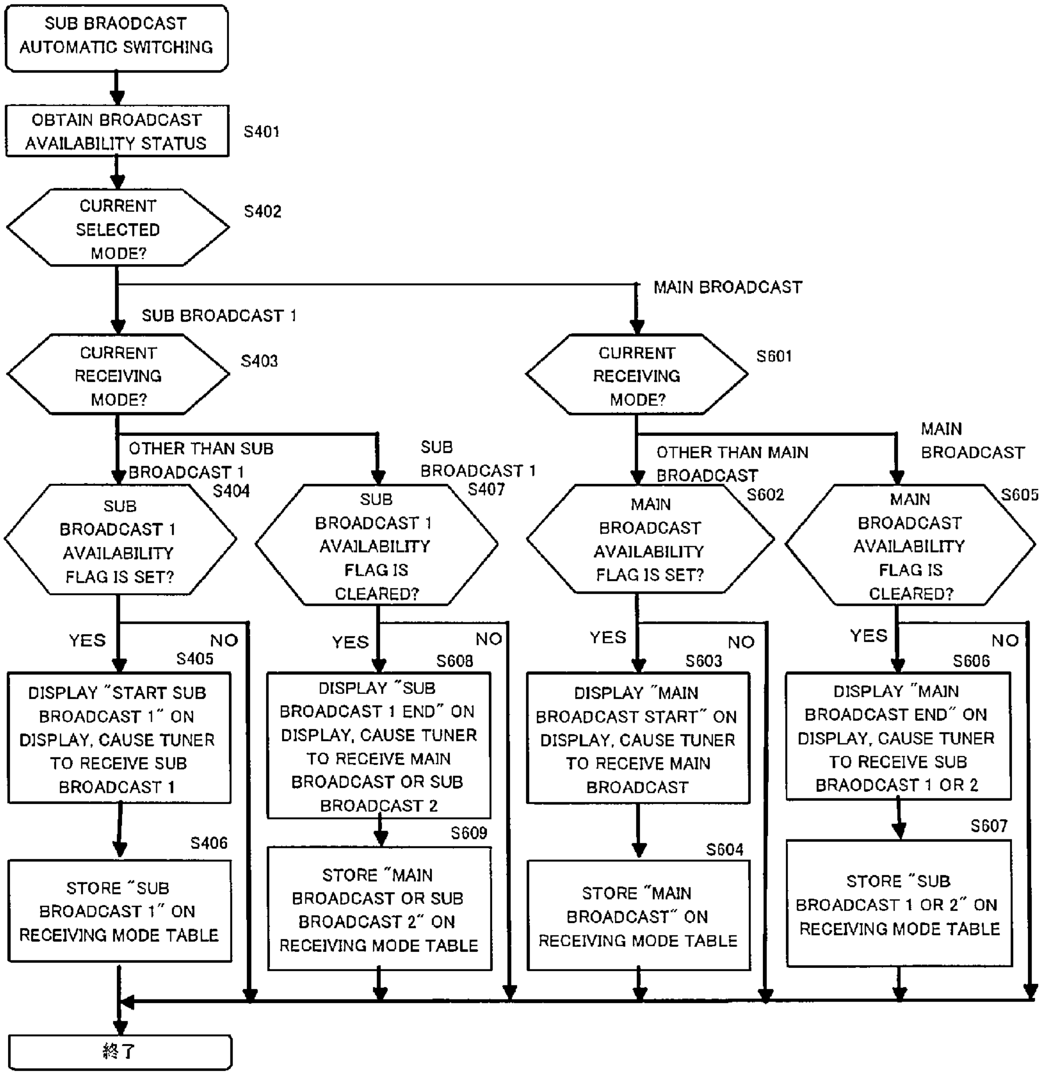
FIG. 6 is a flowchart showing processing to start reception of a booked program.

Referring to FIG. 6, processing to receive the main broadcast by the tuner 2 automatically when the booked main broadcast becomes available will be described. The same processing as that of FIG. 4 is denoted by the same reference numeral and the explanation is omitted. If the selected mode is the main broadcast (S402: main broadcast) and the receiving mode is the sub broadcast 1 or the sub broadcast 2 (S601: other than main broadcast), the microcomputer processor 3 determines whether the main broadcast availability flag is set (S602). If it is set (S602: YES), the microcomputer processor 3 causes the tuner 2 to receive the main broadcast (S603), and stores the main broadcast on the receiving mode table (S604) to thereby release the booking of the main broadcast. On the other hand, if the receiving mode is the main broadcast (S601: main broadcast) and the main broadcast availability flag is cleared (S605: YES), the microcomputer processor 3 causes the tuner 2 to receive the sub broadcast 1 or the sub broadcast 2 (S606), and stores the sub broadcast 1 or the sub broadcast 2 on the receiving mode table (S607) to thereby book the main broadcast.

Note that this also applies to the sub broadcast 1 or the sub broadcast 2, so explanation is omitted. Further, for simplification, the sub broadcast 2 is not shown in FIGS. 5 and 6. In this example, when the sub broadcast 1 selected by the user is currently unavailable and the main broadcast is unavailable either, the sub broadcast 2 is received instead of the sub broadcast 1.

Next, another preferred embodiment of the present invention will be described. In this example, processing similar to that described above is carried out when a program is received by means of timer booking. The memory 7 further stores a timer booking selected mode table and a timer booking receiving mode table. In timer booking, the start time, the end time and a program to be received are stored on the timer booking selected mode table based on the users operation, and at the time set by the user, the microcomputer processor 3 instructs the tuner 2 to receive the program set by the user. The timer booking receiving mode table is a table which stores a program actually received in the timer-booked time zone based on the stored content of the timer booking selected mode table.

Explanation will be given by substituting the timer booking selected mode table and the timer booking receiving mode table for the selected mode table and the receiving mode table, assisted by FIGS. 3 and 4. Referring to FIG. 3, in the case that the sub broadcast 2 (start time 8:00, end time 9:00) is stored on the timer booking selected mode table, (S302: sub broadcast 2), at 8:00 which is the start time, it is determined whether the sub broadcast 2 stored on the timer booking selected mode table is available even though the sub broadcast 1 has been received (S310). If the sub broadcast 2 is unavailable (S310: NO), the microcomputer processor 3 causes the tuner 2 to receive the main broadcast instead of the sub broadcast 2, and stores the main broadcast on the timer booking receiving mode table. Thereby, the stored content of the timer booking selected mode table and the stored content of the timer booking receiving mode table are different, so the sub broadcast 2 stored on the timer booking selected mode table is booked. Referring to FIG. 4, when the sub broadcast 2 becomes available (S411: YES), the microcomputer processor 3 causes the tuner 2 to start receiving the sub broadcast 2 (S412). Then, at 9:00 which is the end time, the microcomputer processor 3 causes the tuner 2 to again receive the program having been received before receiving the sub broadcast 2 (that is, the program stored on the selected mode table). As described above, in the present embodiment, the timer booking selected mode table and the timer booking receiving mode table are additionally provided, and the stored content of the selected mode table will not be erased through reception of a program by timer processing, so it is possible to start reception of the program selected by the user again after reception of the program by timer processing is completed.

Although the preferred embodiments of the present invention have been described, the present invention is not limited to these embodiments. For example, determination of whether the sub broadcast being available is not limited to that by an availability status, and determination may be performed by measuring the intensity of the broadcast received by the tuner 2. In the case of performing determination based on an availability status, an effect that availability of a sub broadcast can be determined immediately is achieved. The present invention may be provided in a mode of a computer program for operating the receiver or a record medium recording the computer program.

The present invention is preferably applicable to a receiver for digital radio broadcasting (terrestrial or satellite) or digital television broadcasting (terrestrial or satellite). In addition to DAB, the present invention is also applicable to ISDB-T, HD Radio, SIRIUS, XM, and DRM for example.

What is claimed is:

1. A receiver comprising:

a selection section for selecting one main broadcast or sub broadcast from broadcasts including the main broadcast and one or a plurality of sub broadcasts;

a reception section for receiving the main broadcast or a sub broadcast;

an availability determination section for determining, when a sub broadcast is selected by the selection section, whether the sub broadcast is available;

an instruction section for instructing the reception section to receive the sub broadcast if the sub broadcast is determined as available, and instructing the reception section to receive the main broadcast instead of the sub broadcast if the sub broadcast is determined as unavailable; and a booking section for booking reception of the sub broadcast when the instruction section instructs the reception section to receive the main broadcast instead of the sub broadcast, wherein if reception of the sub broadcast is booked by the booking section, when the sub broadcast is determined as available by the availability determination section, the instruction section instructs the reception section to receive the sub broadcast.

2. The receiver as claimed in claim 1, wherein when the reception section is receiving a sub broadcast, the availability determination section determines whether the sub broadcast becomes unavailable, and if the sub broadcast is determined to become unavailable, the instruction section instructs the reception section to receive the main broadcast instead of the sub broadcast, and the booking section books reception of the sub broadcast.

3. The receiver as claimed in claim 1, wherein the booking section includes: a selection storage section for storing the main broadcast or a sub broadcast selected by the selection section; and a reception storage section for storing the main broadcast or a sub broadcast received by the reception section, and when a sub broadcast is stored on the selection storage section and the main broadcast is stored on the reception storage section, the booking section books the sub broadcast stored on the selection storage section.

4. The receiver as claimed in claim 3, wherein when a sub broadcast is stored on the reception storage section and the sub broadcast stored on the reception storage section is determined as unavailable by the availability determination section, the instruction section instructs the reception section to receive the main broadcast instead of the sub broadcast, and the booking section books the sub broadcast.

5. The receiver as claimed in claim 1, wherein the broadcast further includes an availability status indicating whether the main broadcast and one or a plurality of sub broadcasts are available, and the availability determination section determines whether a sub broadcast is available based on the availability status.

6. The receiver as claimed in claim 3, wherein the booking section includes:

a timer booking selection storage section for storing a start time, an end time and a sub broadcast to be received at the start time; and a timer booking reception storage section for storing the main broadcast or a sub broadcast received based on a stored content of the timer booking selection storage section, wherein at the start time stored on the timer booking selection storage section, the availability determination section determines whether the sub broadcast stored on the timer booking selection storage section is available, if the sub broadcast is determined as available, the instruction section instructs the reception section to receive the sub broadcast, and if the sub broadcast is determined as unavailable, the instruction section instructs the reception section to receive the main broadcast instead of the sub broadcast, when the instruction section instructs the reception section to receive the main broadcast instead of the sub broadcast, the booking section stores the main broadcast on the timer booking reception storage section to thereby book reception of the sub broadcast, if reception of the sub broadcast is booked by the booking section, when the sub broadcast is determined as available by the availability determination section, the instruction section instructs the reception section to receive the sub broadcast, and at the end time stored on the timer booking selection storage section, the instruction section instructs the reception section to receive the main broadcast or the sub broadcast stored on the selection storage section.

7. A receiver comprising:

a selection section for selecting one program from a broadcast including a plurality of programs;

a reception section for receiving a program;

an availability determination section for determining, when a program is selected by the selection section, whether the program is available;

an instruction section for instructing the reception section to receive the program if the program is determined as available, and instructing the reception section to receive another program instead of the program if the program is determined as unavailable; and a booking section for booking reception of the program selected if the instruction section instructs the reception section to receive the other program, wherein if reception of the program is booked by the booking section, when the program booked is determined as available by the availability determination section, the instruction section instructs the reception section to receive the program booked.

8. Broadcast receiving method comprising the steps of:

selecting one main broadcast or sub broadcast from broadcasts including the main broadcast and one or a plurality of sub broadcasts;

when the sub broadcast is selected, determining whether the sub broadcast selected is available;

when the sub broadcast is determined as available, receiving the sub broadcast;

when the sub broadcast is determined as unavailable, receiving the main broadcast instead of the sub broadcast, when the main broadcast is received instead of the sub broadcast, booking reception of the sub broadcast;

when reception of the sub broadcast is booked, determining whether the sub broadcast booked is available; and when the sub broadcast booked is determined as available, receiving the sub broadcast booked.

* * * * *